United States Patent
Damnjanovic et al.

(10) Patent No.: US 9,288,815 B2
(45) Date of Patent: *Mar. 15, 2016

(54) COMPUTATION OF CHANNEL STATE FEEDBACK IN SYSTEMS USING COMMON REFERENCE SIGNAL INTERFERENCE CANCELATION

(71) Applicant: QUALCOMM Incorporated, San Diego, CA (US)

(72) Inventors: Aleksandar Damnjanovic, San Diego, CA (US); Taesang Yoo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,992

(22) Filed: May 20, 2014

(65) Prior Publication Data

US 2014/0364136 A1    Dec. 11, 2014

Related U.S. Application Data

(63) Continuation of application No. 13/914,346, filed on Jun. 10, 2013, now Pat. No. 8,862,143, which is a continuation of application No. 13/023,432, filed on Feb. 8, 2011, now Pat. No. 8,515,440.

(60) Provisional application No. 61/306,418, filed on Feb. 19, 2010.

(51) Int. Cl.
*H04W 72/00*    (2009.01)
*H04W 72/08*    (2009.01)
(Continued)

(52) U.S. Cl.
CPC ............. *H04W 72/085* (2013.01); *H04B 7/022* (2013.01); *H04B 7/0626* (2013.01);
(Continued)

(58) Field of Classification Search
USPC ................................... 455/450, 561; 375/350
See application file for complete search history.

(56) References Cited

U.S. PATENT DOCUMENTS 5,940,743 A * 8/1999 Sunay et al. .................... 455/69
6,480,558 B1 * 11/2002 Ottosson et al. ............... 375/350
(Continued)

FOREIGN PATENT DOCUMENTS

EP          1503609 A2    2/2005
JP       2011515914 A    5/2011
(Continued)

OTHER PUBLICATIONS

International Search Report and Written Opinion—PCT/US2011/025498, ISA/EPO—Jul. 21, 2011.

(Continued)

*Primary Examiner* — Charles Shedrick
(74) *Attorney, Agent, or Firm* — Nerrie M. Zohn (57) ABSTRACT

When enabled with common reference signal interference cancellation, a user equipment (UE) may still compute a channel state feedback value with consideration of any canceled interfering neighboring signals. When the neighboring cells are determined to be transmitting data during the time for which the channel state feedback value is being computed, the UE is able to derive the channel state feedback value considering those canceled interfering signals. The UE determines whether each neighboring cell is transmitting during the designated time either by obtaining signals that indicate the transmission schedule of the neighboring cells or by detecting the transmission schedule, such as based on the power class of the neighboring cells. If the UE determines that the neighboring cells are transmitting data during this time period, the UE will compute the channel state feedback value including consideration of the canceled interfering signals.

28 Claims, 7 Drawing Sheets

(51) Int. Cl.
*H04B 7/02* (2006.01)
*H04B 7/06* (2006.01)
*H04L 1/00* (2006.01)
*H04W 52/28* (2009.01)
*H04W 52/40* (2009.01)
*H04B 17/24* (2015.01)

(52) U.S. Cl.
CPC .......... *H04L 1/0026* (2013.01); *H04W 52/281* (2013.01); *H04W 72/082* (2013.01); *H04B 17/24* (2013.01); *H04W 52/40* (2013.01)

(56) References Cited

U.S. PATENT DOCUMENTS

| | | |
|---|---|---|
| 6,888,805 B2 | 5/2005 | Bender et al. |
| 7,035,284 B2 | 4/2006 | Willenegger et al. |
| 7,039,001 B2 | 5/2006 | Krishnan et al. |
| 7,292,552 B2 | 11/2007 | Willenegger et al. |
| 8,340,605 B2 | 12/2012 | Hou et al. |
| 8,515,440 B2 | 8/2013 | Damnjanovic et al. |
| 2007/0070908 A1 | 3/2007 | Ghosh et al. |
| 2007/0099665 A1* | 5/2007 | Kim et al. ............ 455/561 |
| 2007/0149128 A1 | 6/2007 | Das et al. |
| 2007/0153935 A1 | 7/2007 | Yang et al. |
| 2007/0211813 A1 | 9/2007 | Talwar et al. |
| 2008/0037672 A1 | 2/2008 | Yun et al. |
| 2008/0112518 A1 | 5/2008 | Wilhelmsson |
| 2009/0082027 A1* | 3/2009 | Yavuz et al. ............ 455/446 |
| 2009/0257390 A1 | 10/2009 | Ji et al. |
| 2010/0008282 A1 | 1/2010 | Bhattad et al. |
| 2010/0173637 A1* | 7/2010 | Damnjanovic et al. ....... 455/447 |
| 2013/0273930 A1 | 10/2013 | Damnjanovic et al. |

FOREIGN PATENT DOCUMENTS

| | | |
|---|---|---|
| TW | 200822771 A | 5/2008 |
| WO | WO-03079576 | 9/2003 |
| WO | WO-03079601 | 9/2003 |
| WO | WO-2004040813 A1 | 5/2004 |
| WO | WO-2007038729 A2 | 4/2007 |
| WO | WO-2007075851 A2 | 7/2007 |
| WO | WO-2009110756 A1 | 9/2009 |
| WO | WO-2009120934 A1 | 10/2009 |
| WO | WO-2010006285 A2 | 1/2010 |
| WO | WO-2010017334 | 2/2010 |
| WO | WO-2011018121 A1 | 2/2011 |

OTHER PUBLICATIONS

Taiwan Search Report—TW100105527—TIPO—Dec. 23, 2013.
Catt: "Considerations on Interference Coordination in Het-Net", 3GPP Draft; R1-100902, 3rd Generation Partnership Project (3GPP), Mobile Competence Centre; 650, Route Des Lucioles; F-06921 Sophia-Antipolis Cedex; France, vol. RAN WGI, No. San Francisco, USA; 20100222, Feb. 16, 2010, XP050418504, [retrieved on Feb. 16, 2010].
Panasonic, Possibility of UE Side ICI Cancellation in Hetnet, 3GPP R1-101274, Feb. 26, 2010.
Qualcomm Incorporated: "Data channel ICIC and the benefits of possible extensions", 3GPP Draft; R1-104819 Data Channel ICIC and the Benefits of Possible Extensions, 3rd Generation Partnership Project (3GPP), Mobile Competence Centre; 650 Route Des Lucioles; F-06921 Sophia-Antipolis Cedex; France, vol. RAN WGI, No. Madrid, Spain; 20100823, Aug. 17, 2010, XP050450003, [retrieved on Aug. 17, 2010] p. 2, paragraph 3.
ZTE: "Discussion on CRS interference and CSI measurements in macropica deployment", 3GPP Draft; R1-105969 Final, 3rd Generation Partnership Project (3GPP), Mobile Competence Centre; 650 Route Des Lucioles; F-06921 Sophia-Antipolis Cedex; France, vol. RAN WG1, no__ Jacksonville, USA; 20101115, Nov. 10, 2010, XP050489768, [retrieved on Nov. 10, 2010].

* cited by examiner

COMPUTATION OF CHANNEL STATE FEEDBACK IN SYSTEMS USING COMMON REFERENCE SIGNAL INTERFERENCE CANCELATION

CROSS-REFERENCE TO RELATED APPLICATIONS

This application is a Continuation of U.S. Ser. No. 13/914,346, filed Jun. 10, 2013, ENTITLED "COMPUTATION OF CHANNEL STATE FEEDBACK IN SYSTEMS USING COMMON REFERENCE SIGNAL INTERFERENCE CANCELLATION", which is a continuation of U.S. Ser. No. 13/023,432, filed Feb. 8, 2011, entitled "COMPUTATION OF CHANNEL STATE FEEDBACK IN SYSTEMS USING COMMON REFERENCE SIGNAL INTERFERENCE CANCELLATION", which claims the benefit of U.S. Provisional Patent Application No. 61/306,418, Feb. 19, 2010, entitled, "SYSTEMS, APPARATUS AND METHODS TO FACILITATE INTERFERENCE CANCELLATION", which is expressly incorporated by reference herein in its entirety.

BACKGROUND

1. Field

Aspects of the present disclosure relate generally to wireless communication systems, and more particularly, to computation of channel state feedback in systems using common reference signal interference cancellation.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

The various aspects of the disclosure are directed to UEs that are enabled with common reference signal interference cancellation. Such UE may still compute its channel state feedback value with consideration of any canceled interfering neighboring signals. When the neighboring cells are determined to be transmitting data during the time or subframe for which the channel state feedback value is being computed, the UE is able to derive the channel state feedback value considering those canceled interfering signals. The UE determines whether each neighboring cell is transmitting during the designated time or subframe either by obtaining signals that indicate the transmission schedule of the neighboring cells or by detecting the transmission schedule, such as based on the power class of the neighboring cells. If the UE determines that the neighboring cells are transmitting data during this time period or subframe, the UE will compute the channel state feedback value including consideration of the canceled interfering signals.

In one aspect of the disclosure, a method of wireless communication includes determining a channel state feedback value after canceling interfering reference signals from a neighboring cell, determining that the neighboring cell will transmit data during a time period, and generating an adjusted channel state feedback value for the time period by adjusting the channel state feedback value based on the canceled interfering reference signals.

In an additional aspect of the disclosure, a UE configured for wireless communication that includes means for determining a channel state feedback value after canceling interfering reference signals from a neighboring cell, means for determining that the neighboring cell will transmit data during a time period, and means for generating an adjusted channel state feedback value for the time period by adjusting the channel state feedback value based on the canceled interfering reference signals.

In an additional aspect of the disclosure, a computer program product has a computer-readable medium having program code recorded thereon. This program code includes code to determine a channel state feedback value after canceling interfering reference signals from a neighboring cell, code to determine that the neighboring cell will transmit data during a time period, and code to generate an adjusted channel state feedback value for the time period by adjusting the channel state feedback value based on the canceled interfering reference signals.

In an additional aspect of the disclosure, a UE includes at least one processor and a memory coupled to the processor. The processor is configured to determine a channel state feedback value after canceling interfering reference signals from a neighboring cell, determine that the neighboring cell will transmit data during a time period, and generate an adjusted channel state feedback value for the time period by adjusting the channel state feedback value based on the canceled interfering reference signals.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
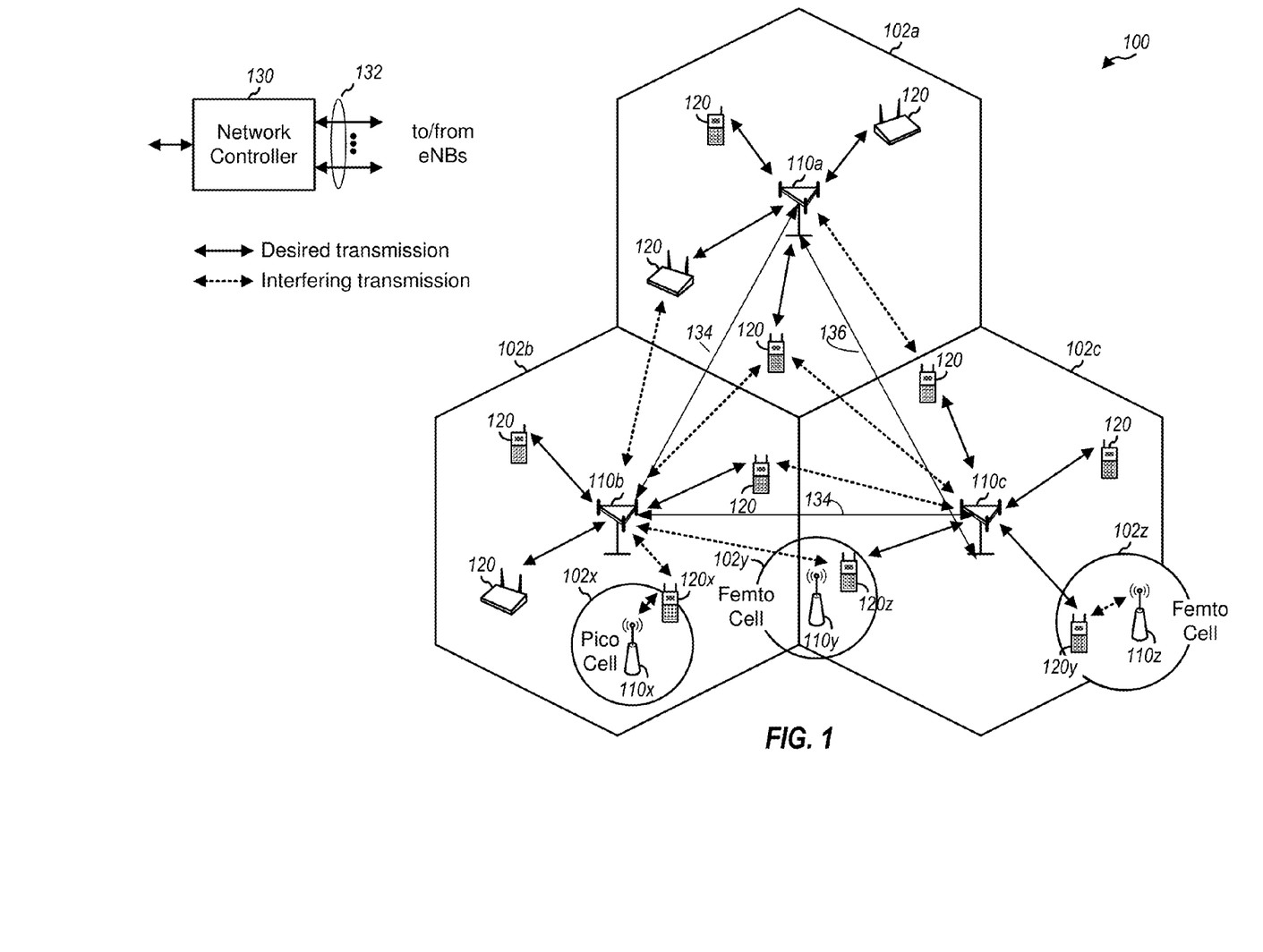
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
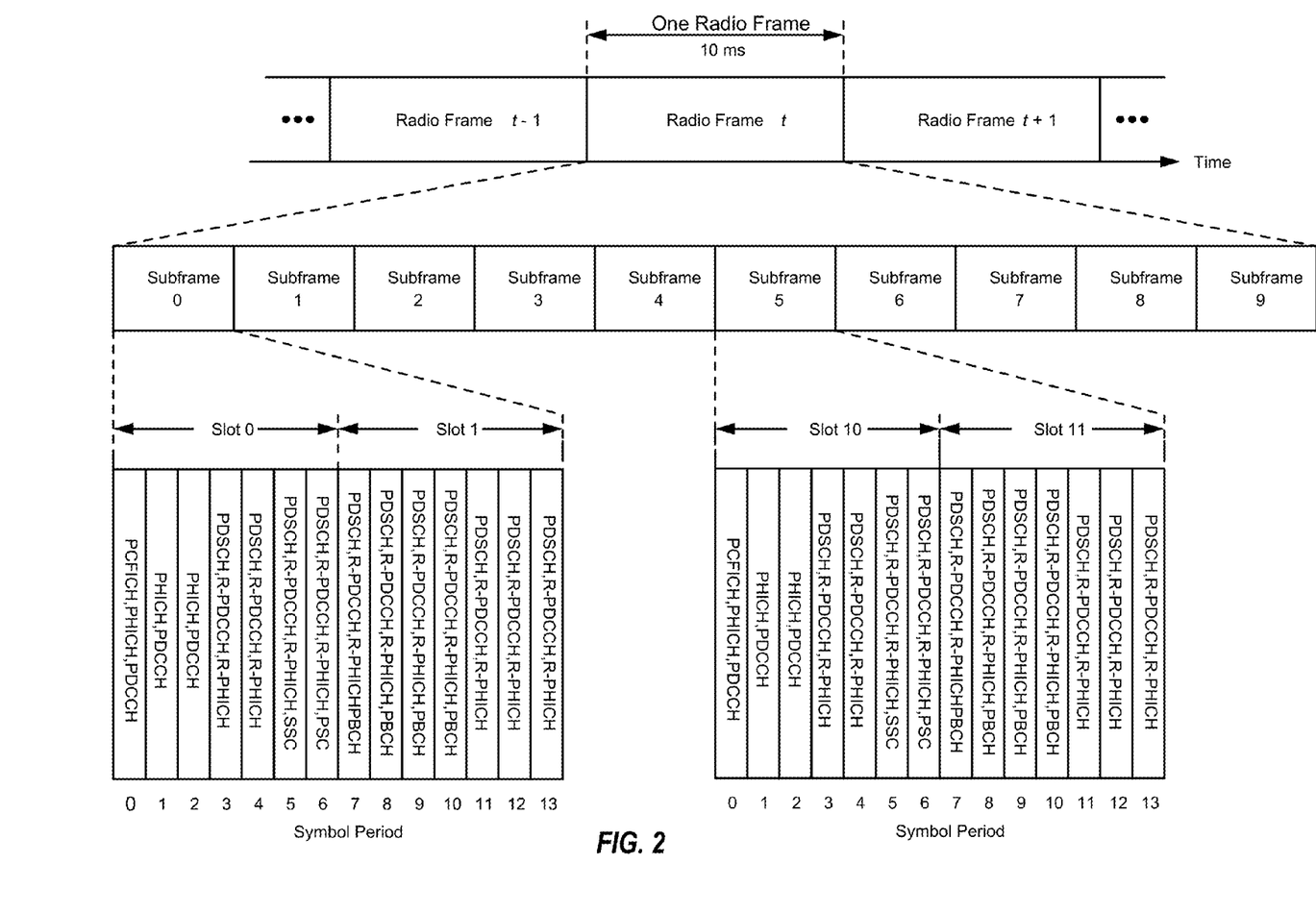
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 3:
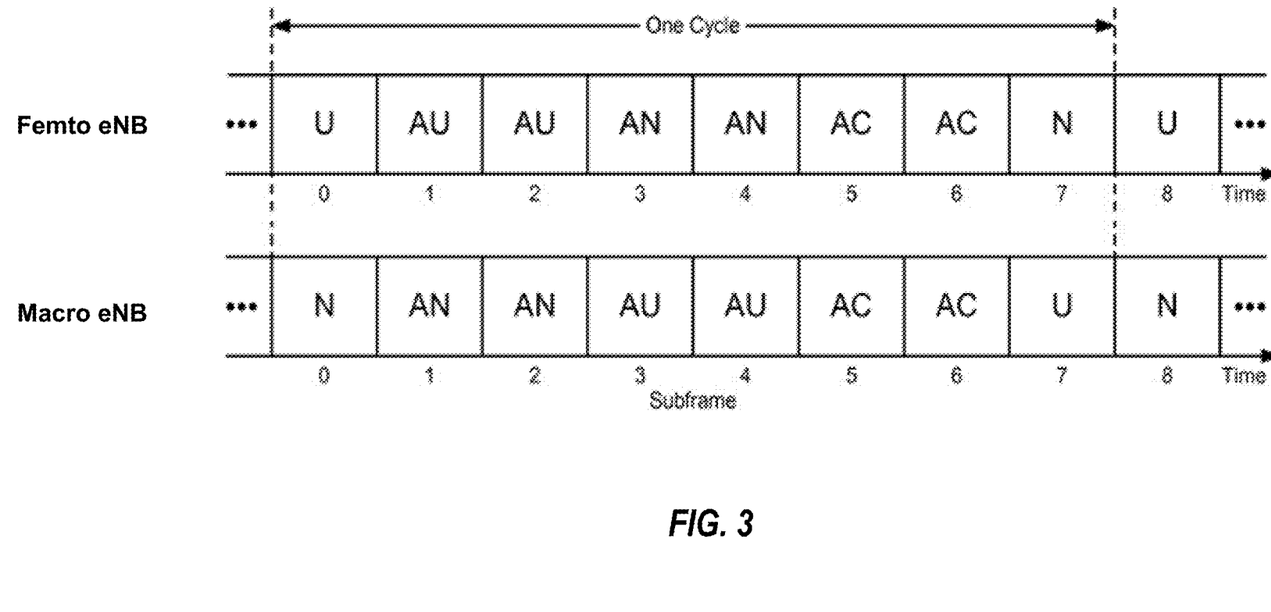
FIG. 3 is a block diagram conceptually illustrating time division multiplexed (TDM) partitioning in a heterogeneous network according to one aspect of the disclosure.

FIG. 3 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120$y$ may be close to the femto eNB 110$y$ and may have high received power for the eNB 110$y$. However, the UE 120$y$ may not be able to access the femto eNB 110$y$ due to restricted association and may then connect to the macro eNB 110$c$ (as shown in FIG. 1) or to the femto eNB 110$z$ also with lower received power (not shown in FIG. 1). The UE 120$y$ may then observe high interference from the femto eNB 110$y$ on the downlink and may also cause high interference to the eNB 110$y$ on the uplink. Using coordinated interference management, the eNB 110$c$ and the femto eNB 110$y$ may communicate over the backhaul 134 to negotiate resources. In the negotiation, the femto eNB 110$y$ agrees to cease transmission on one of its channel resources, such that the UE 120$y$ will not experience as much interference from the femto eNB 110$y$ as it communicates with the eNB 110$c$ over that same channel.

Figure 4:
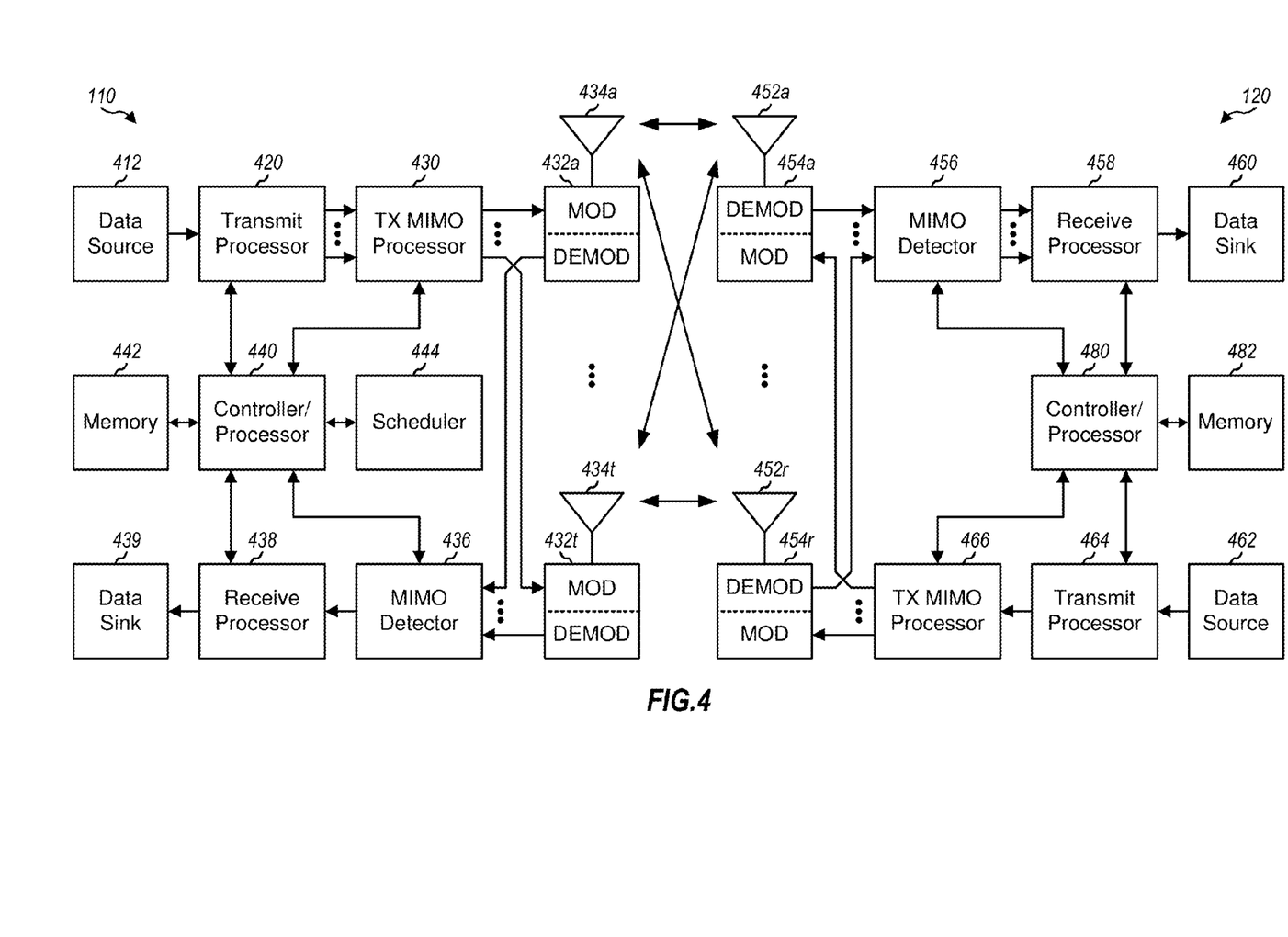
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110$c$ in FIG. 1, and the UE 120 may be the UE 120$y$. The eNB 110 may also be a base station of some other type. The eNB 110 may be equipped with antennas 434$a$ through 434$t$, and the UE 120 may be equipped with antennas 452$a$ through 452$r$.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432$a$ through 432$t$. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432$a$ through 432$t$ may be transmitted via the antennas 434$a$ through 434$t$, respectively.

At the UE 120, the antennas 452$a$ through 452$r$ may receive the downlink signals from the eNB 110 and may provide received signals to the demodulators (DEMODs) 454$a$ through 454$r$, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454$a$ through 454$r$, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454$a$ through 454$r$ (e.g., for SC-FDM, etc.), and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the eNB 110 and the UE 120, respectively. The controllers/processor 440 and/or other processors and modules at the eNB 110 may perform or direct the execution of various processes for the techniques described herein. The controller/processor 480 and/or other processors and modules at the UE 120 may also perform or direct the execution of the functional blocks illustrated in FIGS. 6A, 6B, and 7, and/or other processes for the techniques described herein. The memories 442 and 482 may store data and program codes for the eNB 110 and the UE 120, respectively. A scheduler 444 may schedule UEs for data transmission on the downlink and/or uplink.

In addition to the ICIC effected through coordination of various eNBs in LTE/-A networks, additional interference cancellation may be provided directly by some UEs. The detection and processing power in many advanced UEs allow for the detection and cancellation of interfering signals. One form of this interference cancellation is common reference signal (CRS) interference cancellation. However, in UEs with CRS interference cancellation enabled, difficulties may arise in the communication between the UE and its serving cell. For example, when determining the reference signal for its serving cell, the UE will cancel the interfering reference signals from any interfering neighboring cells. This allows for the UE to obtain a clean and accurate reading of the serving cell reference signal.

In establishing and maintaining communications with the serving cell, the UE periodically or aperiodically computes channel state feedback for the serving cell to use in order to adapt communication with the UE. Channel state feedback may include such feedback indications as channel quality indicators (CQIs), rank indicators (RIs), precoding matrix indicators (PMIs), received signal strength indicators (RSSIs), and the like. The CQI is a measurement or computation that estimates the code rate for the PDSCH that is supportable by the UE under the given channel condition observed on reference signals. The serving cell uses the CQI to determine the modulation and coding scheme (MCS) for the PDSCH. The RI corresponds to the number of useful transmission layers for spatial multiplexing, based on the UE estimate of the downlink channel, which enables the serving cell to adapt the PDSCH transmissions accordingly. The PMI is a feedback signal that supports MIMO operation. It corresponds to the index of the precoder, within a codebook shared by the UE and the serving cell, that allows the serving cell to maximize the aggregate number of data bits which could be received across all downlink spatial transmission layers.

The RSSI is a measurement defined as the total received wideband power observed by the UE from all sources, including co-channel serving and non-serving cells, adjacent channel interference, and thermal noise within the measurement bandwidth. However, in LTE networks, the UE does not transmit the RSSI as a simple channel state feedback value to the serving cell. Instead, the UE uses this channel state feedback value to generate another system metric which it transmits to the serving cell. Specifically in terms of the RSSI channel state feedback value, the UE generates a reference signal received quality (RSRQ). The RSRQ provides a cell-specific signal quality metric that is used to rank different LTE cells according to their signal quality as an input for handover and cell reselection decisions. It is defined as the received signal received power (RSRP) divided by the RSSI.

When CRS interference cancellation is enabled, the UE may compute the channel state feedback value based on a signal in a subframe after cancellation of any interfering signals. This channel state feedback value will reflect a very high quality signal being experienced by the UE, even though there is potentially interference from any of the one or more neighboring cells. Therefore, determinations based on the channel state feedback value or other metrics calculated using the channel state feedback value (e.g., the RSRQ) may be inaccurate or unreliable when CRS interference cancellation cancels the interfering reference signals of neighboring cells that are transmitting data.

Figure 5:
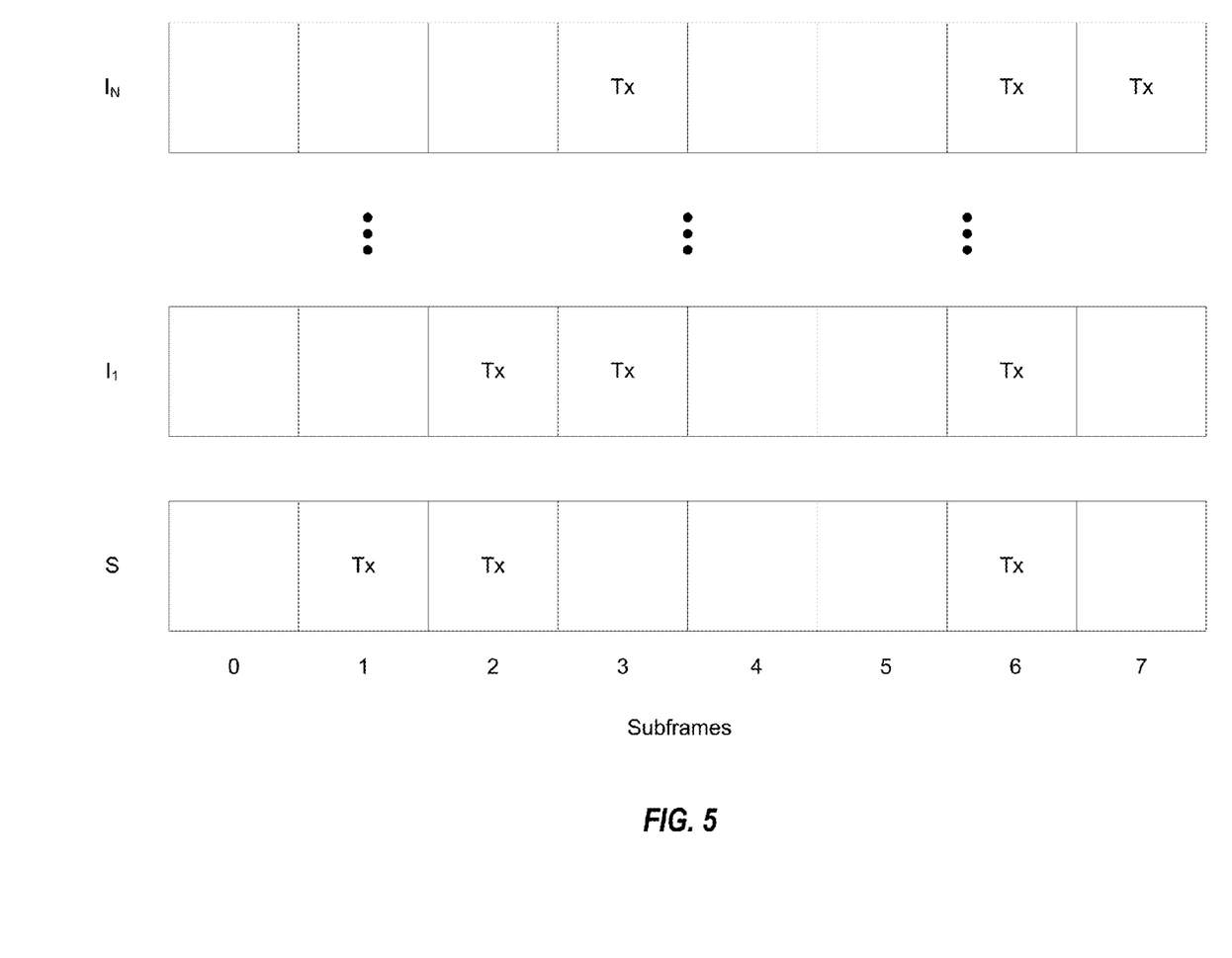
FIG. 5 is a block diagram illustrating multiple signal streams received at a UE that has enabled CRS interference cancellation.

FIG. 5 is a block diagram illustrating multiple signal streams received at a UE that has enabled CRS interference cancellation. FIG. 5 only illustrates 8 subframes of the multiple signal stream, but it should be understood that the signal streams continue beyond the 8 illustrated subframes. Signal stream 'S' represents the signal stream from the serving cell. Signal streams $I_1$ through $I_N$ represent the signal streams from a number of neighboring potentially interfering cells. The UE knows that each of signal streams S and $I_1$ through $I_N$ include reference signals distributed throughout each subframe at predetermined symbol locations and subcarriers. Using CRS interference cancellation, the UE can cancel the reference signals in signal streams $I_1$ through $I_N$. Therefore, the UE is able to accurately read the serving cell reference signal from signal stream S.

The UE is not aware of the transmission schedules of any of the neighboring cells transmitting $I_1$ through $I_N$. Therefore, it cannot know whether any transmissions from the neighboring cells will interfere with its own data transmissions. If the UE were to compute a channel state feedback value, such as the CQI, based only on its own serving reference signals, with all of the interfering reference signals canceled, the channel state feedback value, and subsequently, in the example case of the UE computing the CQI, the serving cell's choice of MCS, will be too optimistic for subframes where neighboring cells are transmitting data. For an example in which the channel state feedback value is the CQI, such a CQI will be accurate for subframe 1 because subframe 1 is allocated exclusive for serving cell S. However, in subframe 2, the neighboring cell transmitting signal stream $I_1$ is transmitting data along with serving cell S. Thus, the UE would experience more interference than its reported CQI reflected. A correct CQI would take the interference from the neighboring cell into account. Similarly, in subframe 6, the UE would experience even more interference in its data transmission based on, at least, both of the neighboring cells transmitting signal streams $I_1$ and $I_N$, with their data transmissions in subframe 6. This inaccuracy would be present in other channel state feedback values, such as RI and PMI.

Figure 6A:
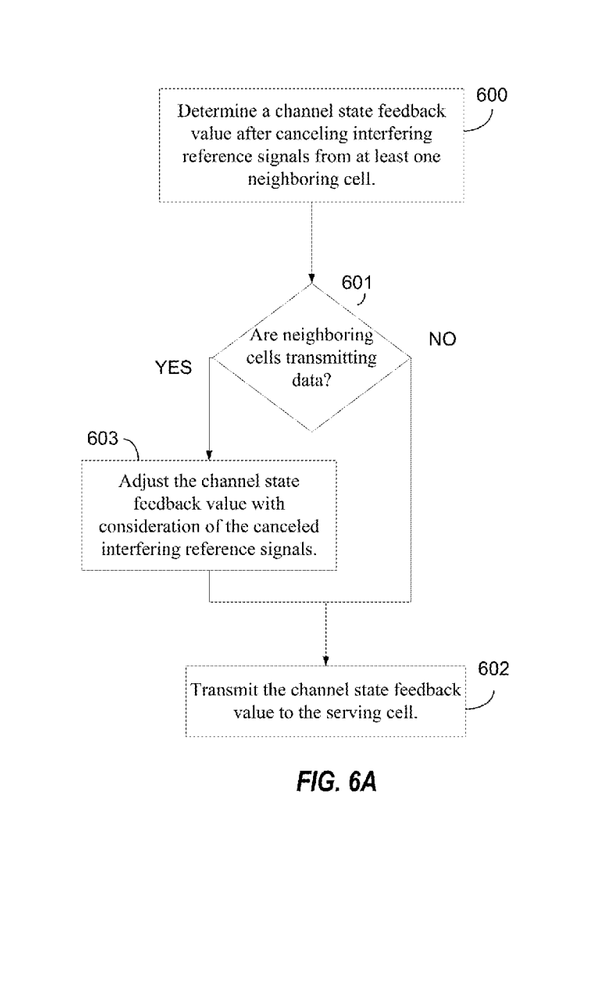
FIG. 6A is a functional block diagram illustrating example blocks executed to implement one aspect of the present disclosure.

FIG. 6A is a functional block diagram illustrating example blocks executed to implement one aspect of the present disclosure. In block 600, a UE determines a channel state feedback value for a particular time period after canceling interfering reference signals from a neighboring cell. A determination is made, in block 601, whether the neighboring cells are transmitting data during the time period. If not, then, in block 602, the UE transmits the channel state feedback value to the serving cell. If the neighboring cell is transmitting data, then the UE adjusts the channel state feedback value, in block 603, for the time period by adjusting the channel state feedback value to consider the canceled interfering reference signals. The UE then transmits the adjusted channel state feedback value to the serving cell in block 602. Therefore, depending on whether the neighboring cell is transmitting during the time period or not, the UE will either transmit a "clean" channel state feedback value (one based on the interfering reference signal canceled) or a "dirty" channel state feedback value (one considering the canceled interfering reference signals).

Figure 6B:
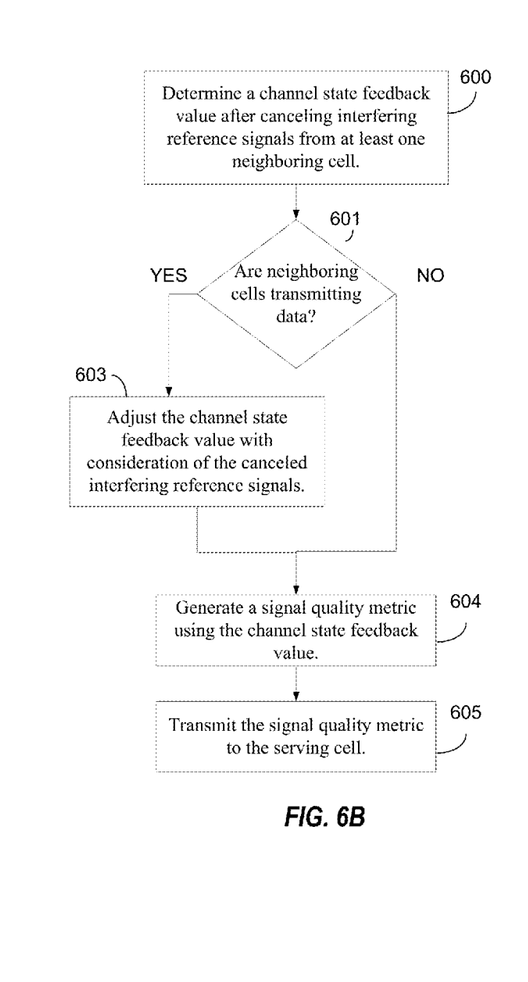
FIG. 6B is a functional block diagram illustrating example blocks executed to implement one aspect of the present disclosure.

FIG. 6B is a functional block diagram illustrating example blocks executed to implement one aspect of the present disclosure. The process described with the functional blocks of FIG. 6B begins in the same fashion as the process described with the functional blocks of FIG. 6A. The UE determines a channel state feedback value, in block 600, after canceling interfering reference signals from at least one neighbor cell. Determining, in block 601, whether the neighboring cells are transmitting data. If so, then the UE adjusts the channel state feedback value with consideration of the canceled interfering reference signals in block 603. If the neighboring cells are not transmitting data, or after adjusting the channel state feedback value in block 603, the UE generates a signal quality metric using the channel state feedback value in block 604. The UE then transmits the signal quality metric to the serving cell in block 605. In this aspect of the present disclosure, instead of transmitting the feedback value itself, the UE uses the feedback value to generated another value, the signal quality metric.

In one example implementation of the function illustrated in FIG. 6B, the channel state feedback value determined is the RSSI, while the signal quality metric generated using this RSSI is the RSRQ. It should be noted, however, that these values are only examples of channel state feedback values and signal quality metrics that may be used in the illustrated process. The various aspects of the present disclosure are not limited to these particular values.

Referring back to FIG. 5, when considering the total received signal seen by a UE in the vicinity of signal streams S and $I_1$ through $I_N$, the total received signal observed on a CRS resource element (RE) may be represented by the following formula:

$$y = h_S\chi_S + h_{I_1}\chi_{I_1} + \ldots h_{I_N}\chi_{I_N} + n \quad (1)$$

where y is the total signal received by the UE, h is the channel signal, $\chi$ is the reference signal, and n is the combined ambient noise (i.e., the combined noise experienced by the UE that does not originate from the neighboring cells 1 through N). When the UE cancels the interfering reference signals, the resulting clean signal $y_c$ may be represented by the following formula:

$$y_c = h_S\chi_S + n \quad (2)$$

For purposes of this example, a CQI channel state feedback value is considered. Generally, the CQI for a given time period or subframe would be computed in a manner based on the following functional relationship:

$$CQI: f\left(\frac{|h_S|^2}{N}\right) \quad (3)$$

where N is the variance of the combined ambient noise experienced at the given time period or subframe. However, instead of using N for a given subframe, the value of N can be substituted with an expected noise plus interference estimate for the time frame or period.

Accordingly, depending on whether the UE determines that one or more of the neighboring cells is transmitting data, the CQI would be computed in a manner based on the following functional relationship:

$$CQI: f\left(\frac{|h_S|^2}{\sum_{k \in S}|h_{I_k}|^2 + N}\right), \quad (4)$$

$$S \subset \{1, \ldots, N\}$$

Where S is the set of neighboring cells that are transmitting data, or:

$$CQI: f\left(\frac{|h_S|^2}{n}\right) \quad (5)$$

for the instance when none of the neighboring cells are transmitting data. Each of the neighboring cells determined to be transmitting data will have its signal component added back into the computation of the CQI, while any neighboring cell determined not to be transmitting data will have its signal component remain canceled.

Figure 7:
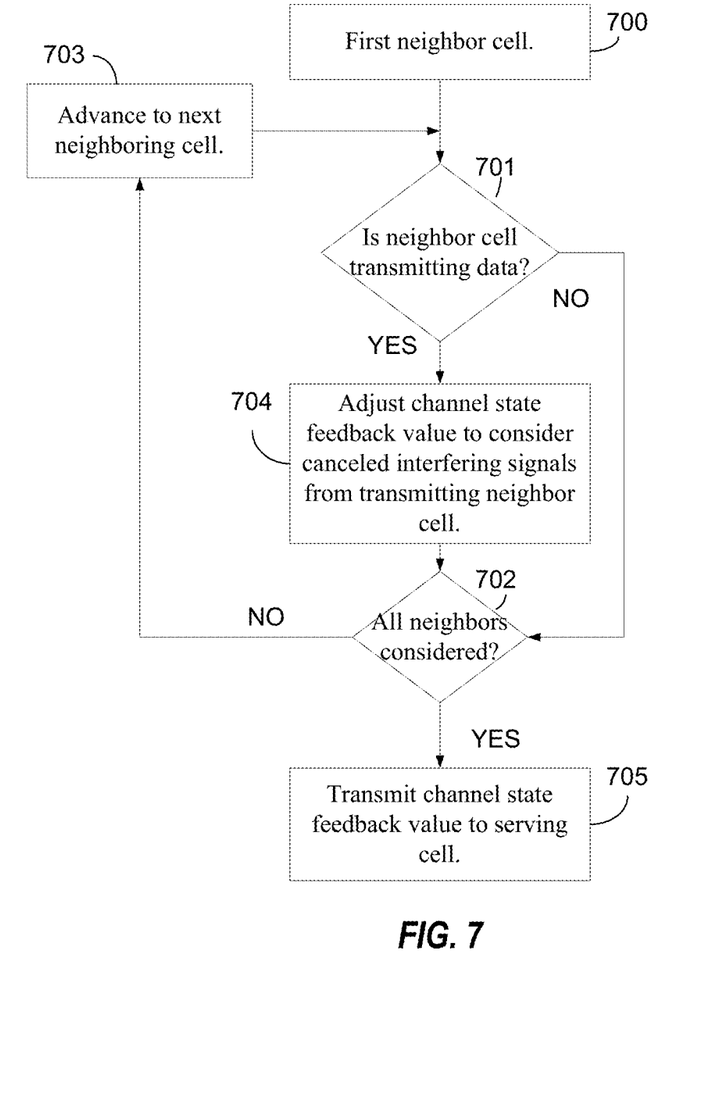
FIG. 7 is a functional block diagram illustrating example blocks executed to implement one aspect of the present disclosure.

FIG. 7 is a functional block diagram illustrating example blocks executed to implement one aspect of the present disclosure. In block 700, the determination process for the UE begins with the first detected neighbor cell. A determination is made, in block 701, whether the neighboring cell is transmitting data during the subframe in which the channel state feedback value is to be computed. A channel state feedback value will generally be indicated for calculation at a particular period of time or subframe. If the neighboring cell is not transmitting data during the subframe, then a determination is made, in block 702, whether all of the neighboring cells have been considered. If not, then, in block 703, the processes advances to consider the next neighboring cells and repeats from block 701. If all of the neighboring cells have been considered, then, in block 705, the channel state feedback value is transmitted to the serving cell. If, in response to the determination of block 701, the neighboring cell is transmitting data during the particular subframe, then, in block 704, the UE adjusts the channel state feedback value to consider the canceled interfering signals from the transmitting neighbor cell. Another determination is made, in block 702, whether or not the UE has considered all of the neighboring cells. If not, then the UE advances to the next neighboring cell in block 703 and repeats the process from block 701. If the UE has considered all of the neighboring cell, then, in block 705, the UE transmits the adjusted channel state feedback value to the serving cell.

Unlike the UE, the serving cell generally knows the scheduling of the neighboring cells. With the various aspects of the present disclosure implemented into a UE, the serving cell will receive the channel state feedback value, recognize the subframe for which the channel state feedback value is computed and, knowing the schedule of the neighboring cells, will know the assumption that the UE has made in the determination of the neighboring cells' transmission status. Thus, the serving cell will consider the channel state feedback value received from the UE to be an accurate indicator in light of any neighboring cells transmitting data.

In order to determine the transmission status of the neighboring cells, the UE may employ a number of different determination processes. In reference to FIG. 1, the UE 120z is located in an area in which it may experience interfering signals from the macro eNB 110b and the femto eNB 110y. In some aspects, the UE 120z may obtain the transmission status of each of the eNBs 110b and 110y through signaling. For example, in one aspect, the UE 120z may read the system information block 1 (SIB1) of each of the eNBs 110b and 110y to obtain the semi-static resource partition information (SRPI). This resource partition information provides the subframe scheduling information for the eNBs 110b and 110y, at least for the semi-statically assigned subframes. Therefore, the UE 120z may use this schedule for the neighboring cells, the eNBs 110b and 110y, to determine the transmission status for any given subframe for which the UE 120z is to compute the channel state feedback value to be sent to its serving cell, the eNB 110c. The serving cell, the eNB 110c, may set a particular periodicity for the UE 120z to compute the channel state feedback value, or may even request such a channel state feedback value on an ad hoc basis.

In another signaling aspect, each of the eNBs 110b and 110y broadcasts its own transmission activities. The UE 120z receives and decodes these broadcast signals to obtain the transmission activity schedules for its neighboring cells, the eNBs 110b and 110y. Again, the UE 120z may then use these schedules to determine the transmission statuses of the neighboring cells for any particular subframe for which it computes the particular channel state feedback value.

In additional aspects of the present disclosure, the UE 120z may use various detection-based algorithms to make the determination of transmission status. For example, one piece of information that the UE 120z may easily obtain with regard to the eNBs 110b and 110y is their cell identifier (ID). One characteristic that may be determined based on the cell ID is the power class that the associated eNB belongs. Using their cell IDs, the UE 120z would determine that the eNB 110y is of a different power than its serving cell, the eNB 110c. It will also determine that the eNB 110b is the same power class as the eNB 110c. The power class of the particular neighboring cell can be used as the basis of a presumption that a neighboring cell of a different power class will not have interfering data transmissions with the serving cell.

The presumption that two neighboring cells of different power class will not interfere with each other is based on the fact that the cell with the higher power class is a macro cell, while the cell with the lower power class is a pico or femto cell. When signals from a femto cell are present with signals from a macro cell, the UE can presume that the macro cell will only allow the femto cell a certain number of assigned subframes. That is, the resource partitioning between the macro cell and femto cell has already been coordinated to avoid such interference, as illustrated in FIG. 3. The same cannot be presumed between two macro cells. Two macro cells may, in fact, have interfering data transmissions with each other. Therefore, by determining the cell ID of each of the eNB 110b and 110y, the UE 120z may find the power class of the eNB 110y means that it will have no interfering data transmissions, while the eNB 110b will.

In another example algorithmic determination, the UE 120z may simply detect whether or not each of the interfering neighbor cells, the eNBs 110b and 110y, is transmitting data. The UE 120z will then be able to determine the transmission schedule directly before determining whether to compute a clean channel state feedback value or a dirty channel state feedback value that includes consideration of the cancelled signal components of the interfering neighbor cells.

In one configuration, the UE 120 configured for wireless communication includes means for determining a channel state feedback value after canceling interfering reference signals from a neighboring cell, means for determining that the neighboring cell will transmit data during a time period, and means for generating an adjusted channel state feedback value for the time period by adjusting the channel state feedback value based on the canceled interfering reference signals. In one aspect, the aforementioned means may be the processor(s), the controller/processor 480, the memory 482, the receive processor 458, the MIMO detector 456, the demodulators 454a, and the antennas 452a configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6A, 6B, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a User Equipment (UE), signaling that indicates resource partitioning information for a plurality of partitioned resources, wherein the plurality of partitioned resources are partitioned between a serving base station and at least one neighbor base station;
   determining, by the UE, whether to expect interference from the at least one neighbor base station on at least one partitioned resource associated with a channel quality report;
   if the determining indicates that there is no expected interference from the at least one neighbor base station on the at least one partitioned resource, cancelling one or more interfering reference signals from the at least one partitioned resource, wherein the one or more interfering reference signals are from the at least one neighbor base station;
   determining a channel quality value for one or more reference signals from the serving base station in the at least one partitioned resource; and
   reporting channel quality for the at least one partitioned resource, the channel quality corresponding to the channel quality value.

2. The method of claim 1, further comprising:
   receiving a signal, the signal comprising a plurality of reference signals from the serving base station and the one or more interfering reference signals from the at least one neighbor base station.

3. The method of claim 2, wherein the one or more canceled interfering reference signals include one or more reference signals for the at least one neighbor base station that overlap one or more reference signals from the serving base station.

4. The method of claim 2, wherein the channel quality corresponds to signal channel quality of one or more reference signals from the serving base station after the canceling.

5. The method of claim 2, wherein the at least one neighbor base station is permitted to transmit on the at least one partitioned resource based on the resource partitioning information.

6. A method of wireless communication, comprising:
   receiving, by a User Equipment (UE), signaling that indicates resource partitioning information for a plurality of partitioned resources, wherein the plurality of partitioned resources are partitioned between a serving base station and at least one neighbor base station;
   determining an expected interference on at least one partitioned resource, wherein the resource partitioning information identifies the at least one neighbor base station as a source of the expected interference;
   receiving a signal, the signal comprising a plurality of reference signals from the serving base station and the at least one neighbor base station;
   canceling one or more interfering reference signals corresponding to the at least one neighbor base station, wherein the one or more canceled interfering reference signals include one or more reference signals for the at least one neighbor base station that overlap one or more reference signals from the serving base station;
   determining a channel quality value for the one or more reference signals from the serving base station after the canceling;
   adjusting the channel quality value by adding interference based on the one or more interfering reference signals associated with the at least one neighbor base station; and
   reporting channel quality for the at least one partitioned resource, the channel quality corresponding to the adjusted channel quality value.

7. The method of claim 6, wherein the partitioning information is a subframe partitioning information, and wherein the plurality of partitioned resources are subframes.

8. A wireless communications apparatus, comprising:
   means for receiving, by a User Equipment (UE), signaling that indicates resource partitioning information for a plurality of partitioned resources, wherein the plurality of partitioned resources are partitioned between a serving base station and at least one neighbor base station;
   means for determining, by the UE, whether to expect interference from the at least one neighbor base station on at least one partitioned resource associated with a channel quality report;
   means for cancelling, if the determining indicates that there is no expected interference from the at least one neighbor base station on the at least one partitioned resource, one or more interfering reference signals from the at least one partitioned resource, wherein the one or more interfering reference signals are from the at least one neighbor base station;
   means for determining a channel quality value for one or more reference signals from the serving base station in the at least one partitioned resource; and
   means for reporting channel quality for the at least one partitioned resource, the channel quality corresponding to the channel quality value.

9. The wireless communications apparatus of claim 8, further comprising:
   means for receiving a signal, the signal comprising a plurality of reference signals from the serving base station and the one or more interfering reference signals from the at least one neighbor base station.

10. The wireless communications apparatus of claim 9, wherein the one or more canceled interfering reference signals include one or more reference signals for the at least one neighbor base station that overlap one or more reference signals from the serving base station.

11. The wireless communications apparatus of claim 9, wherein the channel quality corresponds to signal channel quality of one or more reference signals from the serving base station after the canceling.

12. The wireless communications apparatus of claim 9, wherein the at least one neighbor base station is permitted to transmit on the at least one partitioned resource based on the resource partitioning information.

13. A wireless communications apparatus, comprising:
   means for receiving, by a User Equipment (UE), signaling that indicates resource partitioning information for a plurality of partitioned resources, wherein the plurality of partitioned resources are partitioned between a serving base station and at least one neighbor base station;
   means for determining an expected interference on at least one partitioned resource, wherein the resource partitioning information identifies the at least one neighbor base station as a source of the expected interference;
   means for receiving a signal, the signal comprising a plurality of reference signals from the serving base station and the at least one neighbor base station;
   means for canceling one or more interfering reference signals corresponding to the at least one neighbor base station, wherein the one or more canceled interfering reference signals include one or more reference signals for the at least one neighbor base station that overlap one or more reference signals from the serving base station;
   means for determining a channel quality value for the one or more reference signals from the serving base station after the canceling;
   means for adjusting the channel quality value by adding interference based on the one or more interfering reference signals associated with the at least one neighbor base station; and
   means for reporting channel quality for the at least one partitioned resource, the channel quality corresponding to the adjusted channel quality value.

14. The wireless communications apparatus of claim 13, wherein the partitioning information is a subframe partitioning information, and wherein the plurality of partitioned resources are subframes.

15. A non-transitory computer-readable medium having program code stored thereon that, when executed by a computer, causes the computer to:
   receive, by a User Equipment (UE), signaling that indicates resource partitioning information for a plurality of partitioned resources, wherein the plurality of partitioned resources are partitioned between a serving base station and at least one neighbor base station;
   determine, by the UE, whether to expect interference from the at least one neighbor base station on at least one partitioned resource associated with a channel quality report;
   if the determining indicates that there is no expected interference from the at least one neighbor base station on the at least one partitioned resource, cancel one or more interfering reference signals from the at least one partitioned resource, wherein the one or more interfering reference signals are from the at least one neighbor base station;
   determine a channel quality value for one or more reference signals from the serving base station in the at least one partitioned resource; and
   report channel quality for the at least one partitioned resource, the channel quality corresponding to the channel quality value.

16. The non-transitory computer-readable medium of claim 15, wherein the program code further causes the computer to:
   receive a signal, the signal comprising a plurality of reference signals from the serving base station and the one or more interfering reference signals from the at least one neighbor base station.

17. The non-transitory computer-readable medium of claim 16, wherein the one or more canceled interfering reference signals include one or more reference signals for the at least one neighbor base station that overlap one or more reference signals from the serving base station.

18. The non-transitory computer-readable medium of claim 16, wherein the channel quality corresponds to signal channel quality of one or more reference signals from the serving base station after the canceling.

19. The non-transitory computer-readable medium of claim 16, wherein the at least one neighbor base station is permitted to transmit on the at least one partitioned resource based on the resource partitioning information.

20. A non-transitory computer-readable medium having program code stored thereon that, when executed by a computer, causes the computer to:
   receive, by a User Equipment (UE), signaling that indicates resource partitioning information for a plurality of partitioned resources, wherein the plurality of partitioned resources are partitioned between a serving base station and at least one neighbor base station;
   determine an expected interference on at least one partitioned resource, wherein the resource partitioning information identifies the at least one neighbor base station as a source of the expected interference;
   receive a signal, the signal comprising a plurality of reference signals from the serving base station and the at least one neighbor base station;
   cancel one or more interfering reference signals corresponding to the at least one neighbor base station, wherein the one or more canceled interfering reference signals include one or more reference signals for the at least one neighbor base station that overlap one or more reference signals from the serving base station;
   determine a channel quality value for the one or more reference signals from the serving base station after the canceling;
   adjust the channel quality value by adding interference based on the one or more interfering reference signals associated with the at least one neighbor base station; and
   report channel quality for the at least one partitioned resource, the channel quality corresponding to the adjusted channel quality value.

21. The non-transitory computer-readable medium of claim 20, wherein the partitioning information is a subframe partitioning information, and wherein the plurality of partitioned resources are subframes.

22. An apparatus configured for wireless communication, the apparatus comprising:
   at least one processor configured to:
      receive, by a User Equipment (UE), signaling that indicates resource partitioning information for a plurality of partitioned resources, wherein the plurality of partitioned resources are partitioned between a serving base station and at least one neighbor base station;
      determine, by the UE, whether to expect interference from the at least one neighbor base station on at least one partitioned resource associated with a channel quality report;
      if the determining indicates that there is no expected interference from the at least one neighbor base station on the at least one partitioned resource, cancel one or more interfering reference signals from the at least one partitioned resource, wherein the one or more interfering reference signals are from the at least one neighbor base station;

determine a channel quality value for one or more reference signals from the serving base station in the at least one partitioned resource; and report channel quality for the at least one partitioned resource, the channel quality corresponding to the channel quality value; and a memory coupled to said at least one processor.

23. The apparatus of claim 22, wherein said at least one processor is further configured to:

receive a signal, the signal comprising a plurality of reference signals from the serving base station and the one or more interfering reference signals from the at least one neighbor base station.

24. The apparatus of claim 23, wherein the one or more canceled interfering reference signals include one or more reference signals for the at least one neighbor base station that overlap one or more reference signals from the serving base station.

25. The apparatus of claim 23, wherein the channel quality corresponds to signal channel quality of one or more reference signals from the serving base station after the canceling.

26. The apparatus of claim 23, wherein the at least one neighbor base station is permitted to transmit on the at least one partitioned resource based on the resource partitioning information.

27. An apparatus configured for wireless communication, the apparatus comprising:

at least one processor configured to:

receive, by a User Equipment (UE), signaling that indicates resource partitioning information for a plurality of partitioned resources, wherein the plurality of partitioned resources are partitioned between a serving base station and at least one neighbor base station;

determine an expected interference on at least one partitioned resource, wherein the resource partitioning information identifies the at least one neighbor base station as a source of the expected interference;

receive a signal, the signal comprising a plurality of reference signals from the serving base station and the at least one neighbor base station;

cancel one or more interfering reference signals corresponding to the at least one neighbor base station, wherein the one or more canceled interfering reference signals include one or more reference signals for the at least one neighbor base station that overlap one or more reference signals from the serving base station;

determine a channel quality value for the one or more reference signals from the serving base station after the canceling;

adjust the channel quality value by adding interference based on the one or more interfering reference signals associated with the at least one neighbor base station; and report channel quality for the at least one partitioned resource, the channel quality corresponding to the channel quality value; and a memory coupled to said at least one processor.

28. The apparatus of claim 27, wherein the partitioning information is a subframe partitioning information, and wherein the plurality of partitioned resources are subframes.

* * * * *